United States Patent
Lundby et al.

(10) Patent No.: US 7,986,709 B2
(45) Date of Patent: Jul. 26, 2011

(54) SYSTEMS AND METHODS FOR INCREASING THE CAPACITY OF A CHANNEL IN A COMMUNICATIONS SYSTEM

(75) Inventors: Stein Arne Lundby, Solana Beach, CA (US); Serge D. Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 838 days.

(21) Appl. No.: 11/843,565

(22) Filed: Aug. 22, 2007

(65) Prior Publication Data

US 2008/0049655 A1 Feb. 28, 2008

Related U.S. Application Data

(60) Provisional application No. 60/839,479, filed on Aug. 22, 2006.

(51) Int. Cl.
*H04B 7/212* (2006.01)
*H04L 12/56* (2006.01)

(52) U.S. Cl. ........ 370/442; 370/252; 370/278; 370/282; 370/337

(58) Field of Classification Search ............... 370/252, 370/278, 282, 337, 442
See application file for complete search history.

(56) References Cited

U.S. PATENT DOCUMENTS

| | | | |
|---|---|---|---|
| 5,410,546 A | | 4/1995 | Boyer et al. |
| 5,943,324 A | * | 8/1999 | Ramesh et al. ............... 370/321 |
| 5,982,761 A | * | 11/1999 | Dutta ........................... 370/337 |
| 6,470,004 B1 | * | 10/2002 | Murata ......................... 370/347 |
| 2004/0192201 A1 | * | 9/2004 | Febvre et al. ................ 455/13.2 |

FOREIGN PATENT DOCUMENTS

| | | |
|---|---|---|
| RU | 2237977 C2 | 10/2004 |
| WO | WO0126269 A1 | 4/2001 |
| WO | WO0233911 A1 | 4/2002 |

OTHER PUBLICATIONS

"Universal Mobile Telecommunications System (UMTS); Physical layer procedures (FDD) (3GPP TS 25.214 version 7.1.0 Release 7); ETSI TS 125 214," ETSI Standards, European Telecommunications Standards Institute, Sophia-Antipo, FR, vol. 3-R1, No. V710, Jun. 2006, XP014034264, ISSN: 0000-0001.
Lucent Technologies: "Initial DPCH frame offset for F-DPCH" 3GPP TSG-RAN WG2 #51, No. R2-060398, Feb. 13, 2006 (Feb. 17, 2006) XP002470362 Denver, Colorado, USA, entire document.
Nokia, "F-DPCH operation in SHO," 3GPP TSG-RAN WG1 Meeting #40, No. R1-050151, Feb. 14, 2005-Feb. 18, 2005, XP002470363, Scottsdale, AZ, USA, entire document.
Qualcomm Europe: "F-DPCH Time Alignment," 3GPP TSG-RAN WG1 Meeting #46, No. R1-0620241, Aug. 28, 2006-Sep. 1, 2006, XP002469642, Tallinn, Estonia, entire document.
International Search Report, PCT/US07/076576, International Search Authority, European Patent Office—Mar. 7, 2008.
Written Opinion, PCT/US07/076576, International Search Authority, European Patent Office—Mar. 7, 2008.

* cited by examiner

*Primary Examiner* — John Pezzlo
(74) *Attorney, Agent, or Firm* — Francois Pelaez; Darren M. Simon

(57) ABSTRACT

In accordance with a method for increasing the capacity of a channel in a communications system, characteristics of a channel may be evaluated. The channel may include a plurality of slots, and the slots may have a slot format among a set of slot formats. A slot format among the set of slot formats may be selected. The selection may be based on the evaluated characteristics of the channel. Selecting the slot format may include selecting the position of a signal within each of the plurality of slots. The position of the signal may be different for each of the slot formats. The signal may be transmitted in each of the plurality of slots over the channel.

24 Claims, 8 Drawing Sheets

| Slot Format | Channel Bit Rate (kbps) | Channel Symbol Rate (ksps) | SF | Bits/Slot | $N_{OFF1}$ Bits/Slot | $N_{TPC}$ Bits/Slot | $N_{OFF2}$ Bits/Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

FIG. 5

SYSTEMS AND METHODS FOR INCREASING THE CAPACITY OF A CHANNEL IN A COMMUNICATIONS SYSTEM

RELATED APPLICATIONS

This application is related to and claims priority from U.S. Patent Application Ser. No. 60/839,479 filed Aug. 22, 2006, for OFFSETS TO MAXIMIZE FRACTIONAL DPCH CAPACITY, with inventors Stein A. Lundby and Serge Willenegger, which is incorporated herein by reference.

TECHNICAL FIELD

The present invention relates generally to wireless communications and wireless communications-related technology. More specifically, the present invention relates to systems and methods for increasing the capacity of a communications system.

BACKGROUND

Wireless communication networks are widely deployed to provide various types of services such as voice, packet data, broadcast, and so on. For example, these wireless networks include Code Division Multiple Access 2000 (CDMA2000) networks, Global System for Mobile Communications (GSM) networks, Wideband Code Division Multiple Access (W-CDMA) networks and Worldwide Interoperability for Microwave Access (WiMAX) networks.

Each wireless network utilizes a particular air interface to support over-the-air communication and typically further implements a particular mobile networking protocol that supports roaming and advanced services. For example, a W-CDMA network utilizes a code division multiple access (CDMA) air interface and GSM EDGE Radio Access Network (GERAN) networking protocol.

The telecommunication standards cited above are examples of some of the various communications systems that may be implemented to transmit voice and/or data. Within these systems, multiple users share limited system resources. One such limitation is the availability of channels to support multiple users. In these networks, each user within the range of a base station is typically assigned one or more channels to conduct communications with the base station. If there were not enough channels, then a new user that is entering the range of the base station may be blocked from accessing the services of that base station.

In certain situations, it is desirable to transmit the same data to several users. However, cellular base stations are presently configured to transmit the data with the same timing offset. In other words, not all available offsets are used by the base station to transmit the data and the capacity of a channel is limited because the channel is limited as to the number of mobile station it can transmit data to. Thus, benefits may be realized by providing systems and methods for increasing the capacity of the channel in a communications system.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 5 is a slot format chart that illustrates the number of bits that are transmitted for certain periods;

DETAILED DESCRIPTION

Figure 1:
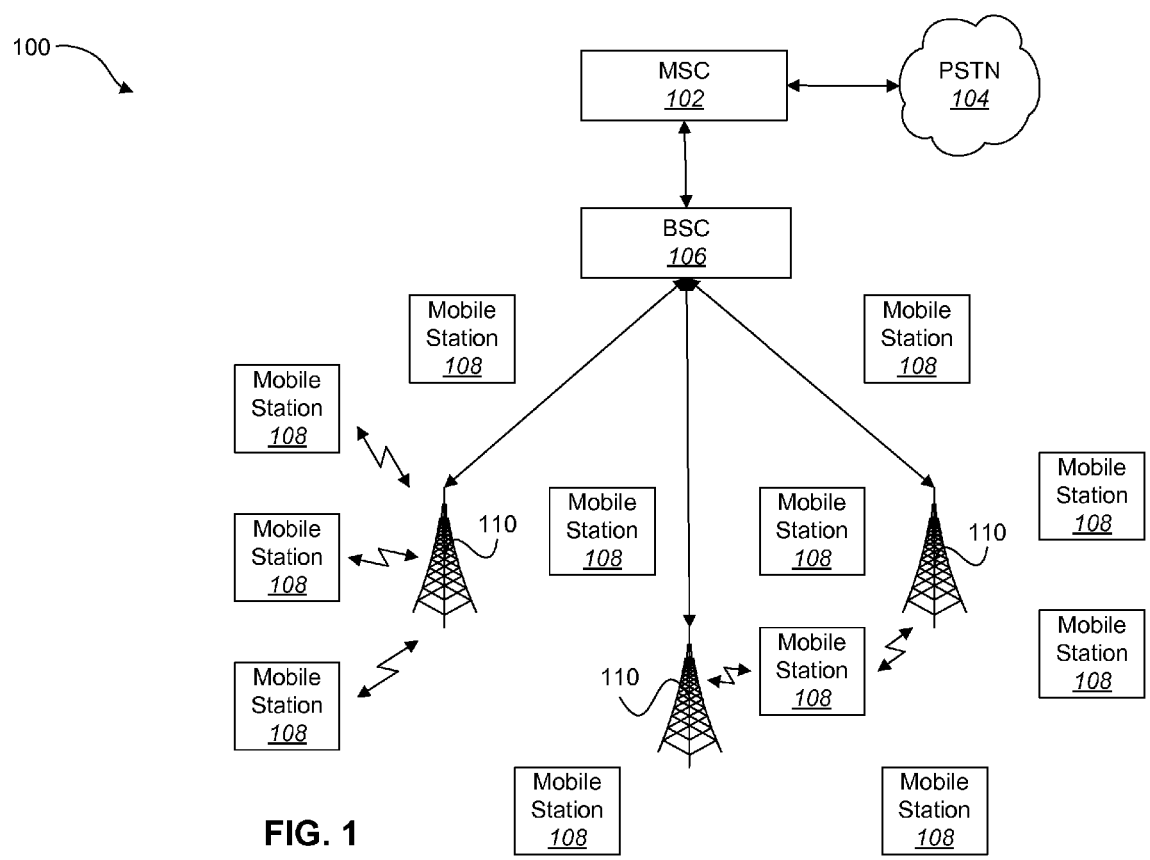
FIG. 1 illustrates one configuration of a wireless communication system.

A method for increasing the capacity of a channel in a communications system is described. The channel may include a plurality of slots, and the slots may have a slot format among a set of slot formats. In accordance with the method, characteristics of a channel may be evaluated. A slot format among the set of slot formats may be selected. The selection may be based on the evaluated characteristics of the channel. Selecting the slot format may include selecting the position of a signal within each of the plurality of slots. The position of the signal may be different for each of the slot formats. The signal may be transmitted in each of the plurality of slots over the channel.

The signal may be a power control command (TPC). In one embodiment, the channel is a fractional dedicated physical channel. The channel may be transmitted in a Wideband Code Division Multiple Access (W-CDMA) system. The channel comprises ten streams for transmitting bits. The channel may be transmitted from a base station to a mobile. The mobile comprises an active list. The active list comprises the identification of one or more base stations. The slot formats may be specific to the cell. A slot format may differ from another slot format through a different timing offset.

The channel may be transmitted in an asynchronous network. Ten transmission power control (TPC) bits may be transmitted on the channel. The TPC bits comprise a cell-specific offset. TPC bits with different timing offsets may be combined at a mobile.

A base station that is configured to increase the capacity of a channel in a communications system is also described. The channel may include a plurality of slots, and the slots may have a slot format among a set of slot formats. The base station may include a processor and memory in electronic communication with the processor. Instructions may be stored in the memory. The instructions may be executable to evaluate characteristics of the channel. The instructions may also be executable to select a slot format among the set of slot formats. The selection may be based on the evaluated characteristics of the channel. Selecting the slot format may include selecting the position of a signal within each of the plurality of slots. The position of the signal may be different for each of the slot formats. The instructions may also be executable to transmit the signal in each of the plurality of slots over the channel.

A computer program product is also described. The computer program product may include a computer-readable medium. The computer-readable medium may include code for evaluating characteristics of a channel in a communications system. The channel may include a plurality of slots. The slots may have a slot format among a set of slot formats. The computer-readable medium may also include code for selecting the slot format among the set of slot formats. The selection may be based on the evaluated characteristics of the channel. Selecting the slot format may include selecting the position of a signal within each of the plurality of slots. The position of the signal may be different for each of the slot formats. The computer-readable medium may also include code for transmitting the signal in each of the plurality of slots over the channel.

A mobile that is configured to increase the capacity of a channel in a communications system is also described. The channel may include a plurality of slots, and the slots may have a slot format among a set of slot formats. The mobile may include a processor and memory in electronic communication with the processor. Instructions may be stored in the memory. The instructions may be executable to provide the timing of one or more slots to a base station. The instructions may also be executable to receive a timing offset that is based on the timing of the one or more slots provided to the base station. The timing offset may indicate the position of a signal within the one or more slots. The instructions may also be executable to receive one or more slots on a fractional dedicated physical channel (F-DPCH). The one or more slots may include the signal with a timing offset that is different from the timing offset of the signal transmitted to different mobiles.

A method for increasing the capacity of a communication system is also described. In accordance with the method, a first slot of a first channel from a first base station may be received. The first slot may use a first slot format. A second slot of a second channel from a second base station may be received. The second slot may use a second slot format that is different from the first slot format. The first and second slots may carry a first and a second power control command. The transmit power of the device may be adjusted according to the first and second power control commands.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In wireless systems, the downlink denotes communications from a base station to a mobile. The uplink denotes communications from a mobile to a base station.

Cellular networks may be composed of mobiles (mobile stations, user equipment (UE), users), base stations (BS, cell, Node B, Base Station Transceiver Subsystem (BTS)) and base station controllers (BSC, Radio Network Controller, etc.) In certain embodiments, the base station controller may be integrated with the base stations.

Mobiles in systems such as code division multiple access (CDMA) may be in communication with several base stations simultaneously. This may be referred to as soft-handoff or soft-handover. The set of base stations that are in active communication with a mobile may be referred to as the mobile's active-set.

A radio link may refer to the overall communication link between the network and a mobile. Transmissions between a base station and a mobile may occur over physical channels. A radio link on the downlink may therefore be composed of several physical channels: one or more for each base station in the active-set of the mobile. In W-CDMA, a physical channel may be referred to as a Dedicated Physical Channel (DPCH).

Data may be encoded and transmitted in blocks referred to as frames. A frame may be further sub-divided into slots. For example, in W-CDMA slots may last for 0.67 milliseconds (ms) and frames may last 10 ms, i.e., 15 slots.

W-CDMA is a cellular mobile system that allows operation with base stations that do not have an external source of time synchronization. Communications over a wired network between the base station controller and the various base stations allow the timing in all base stations to be adjusted such that it is synchronized within several milliseconds. This clock may then be used to pace communications between the base stations and the mobiles.

In contrast, the CDMA2000 mobile system may require base stations to be synchronized within a few microseconds.

This kind of tight synchronization is typically achieved by deriving the clock source from the Global Positioning System (GPS).

Since the timing in W-CDMA differs from one base station to another, the timing of mobiles may not be tightly tied to any particular clock. Mobiles in a W-CDMA system may synchronize their clocks by receiving signals from the network. When a radio link is first set up, the timing of this radio link may be communicated to the mobile. The mobile may then progressively adapt its timing to follow fluctuations that may occur due to variations in the propagation time of signals over the wireless medium.

When a mobile enters the area of coverage of a new base station, the new base station may be added to the mobile's active-set, and the network may set the transmission timing of the physical channel on the downlink from the new base station such as to follow that of the mobile. The mobile may combine frames received from all base stations in the active-set as they are received, with minimal buffering.

Release 5 of W-CDMA defines a method of transmitting data on the downlink using a shared data channel. This new transmission method is referred to as High Speed Downlink Packet Access (HSDPA). The channel over which data is sent is referred to as High Speed Dedicated Shared Channel (HS-DSCH) and is shared in time among all the mobiles. Mobiles that use HSDPA receive their data one at a time through the HS-DSCH. Even though all the data is sent over the HS-DSCH, a DPCH is nevertheless maintained to each mobile to carry power control (PC) commands and potentially some signaling.

Release 6 of W-CDMA introduced a Fractional DPCH (F-DPCH). The F-DPCH is a channel on the downlink that is only used to carry power control commands from the base station to one or several mobiles. The format of each slot of the F-DPCH includes no data being transmitted during the first and last portions of the slot, and a power control command (TPC) in the middle of the slot starting at a fixed position. TPC commands are instructions that command mobiles to increase or decrease their transmit power.

F-DPCH may share the same channel physical channel, as long as their TPC commands do not overlap. This is due to the fact that a F-DPCH only transmits the TPC command, and the remaining portion of the slot is empty. The F-DPCH for mobiles that have timings sufficiently different from each other such that their TPC does not overlap may therefore use the same physical channel. This allows the base station to require fewer physical channels.

In W-CDMA, up to ten F-PDCH may share the same physical channel. TPC commands for up to ten mobiles may then be sent on the same physical channel by transmitting one command after the other. When all ten commands for the ten mobiles have been transmitted, the transmission process starts again with the next ten PC commands for the same ten mobiles. All ten TPC commands are sent within the duration of one slot of 0.667 milliseconds (ms) in duration. New TPC commands may be generated and transmitted in every slot. The F-DPCH is therefore shared in time among ten mobiles.

Current W-CDMA standards require that all base stations in the active-set of a mobile facilitate the transmission of the TPC bits to the mobile with the same timing offsets. However, this requirement includes a consequence because not all timing offsets may be used because mobiles engaged in a soft-handoff effectively block each other.

The F-DPCH is theoretically efficient at supporting many mobiles. However, in practice an existing restriction is placed on base stations that severely limit the number of mobiles that may be supported. The restriction includes that for a given mobile the TPC from all F-DPCH must have the same offset timing. The present systems and methods are directed to removing the restriction that for a given mobile, the TPC from all F-DPCH must have the same offset timing. While the present systems and methods discuss the F-DPCH carrying PC commands, the F-DPCH may carry other information to the mobile. With the F-DPCH design, the F-DPCH for several mobiles may share the same code channel (i.e. OVSF code in W-CDMA) as long as the timing of the mobiles are different enough such that their respective TPCs will not overlap. In addition, W-CDMA may require that all base stations in the active-set of a mobile transmit the F-DPCH with slots aligned. This may make it even less likely that mobiles can be multiplexed together on the same code channel.

The present systems and methods provide a solution to this by defining base station specific F-DPCH slot formats. Each of the slot formats have the TPC segments in a different position within the slot. By varying the slot format, the network can therefore adjust the position of the TPC for each base station for each mobile such as to pack as many F-DPCH as possible on the same code channel.

Embodiments of the present systems and methods introduce slot formats for the F-DPCH that are specific to each base station. Each slot format differs from other slot formats through a different timing offset. A system, such as a wireless communications system, may thereby adjust the timing of the PC bit in an asynchronous network such as to utilize each F-DPCH to its maximum.

As previously explained, embodiments of the present systems and methods introduce TPC offsets specific to each base station, which removes the timing restriction to the TPC bits and allows each base station to use the best TPC offset available. A mobile may combine the TPC commands that do not arrive at the same frame offset. In one embodiment, mobile processing time is unchanged.

In practice, the capacity of a physical channel carrying F-DPCH signals may only be three to four users. This low capacity may be due to the high power control rate of 1500 Hz, the need to send TPC commands from all base stations in the active set and the timing restriction of the TPC bits as previously explained. In one embodiment, the F-DPCH carries TPC commands generated at layer 1. From the perspective of a mobile, it is a special case of a downlink Dedicated Physical Channel (DPCH) that carries a TPC command in each slot. From the perspective of a base station, the F-DPCH includes a spreading factor (SF) of 256 and is a channel that carries up to ten TPC streams for ten different mobiles.

In soft handoff regions, mobiles may receive TPC commands from every base station in their active set. If each mobile has on average 1.5 base stations in its active set, the net capacity of an F-DPCH may be 10/1.5=6.7 users. The capacity of the F-DPCH, however, may be further reduced due to the timing restriction on the TPC bits mentioned above. For example, TPC commands from a first base station and a second base station may arrive at a first mobile within a narrow time window. A second mobile may attempt to enter the region of the second base station. In other words, the second mobile is going to add the second base station in its active set and will receive a TPC command stream from the second base station. In this example, both the first mobile and the second mobile happen to be using the same timing offset for their TPC bits. The second base station may not support the second mobile on the F-DPCH. The second base station may allocate a new F-DPCH or send a re-configuration message to the second mobile to switch to a different time offset for the TPC bits. In practice, this problem of offsets increases as the number of mobiles and base stations increase. Eventually the capacity of each F-DPCH is drastically reduced and the capacity of the F-DPCH goes down from 6.7 users to a mere three or four users per channel.

FIG. 1 illustrates a Wideband Code-Division Multiple Access (W-CDMA) wireless telephone system 100 that may include a plurality of mobiles 108, a plurality of base stations 110, a base station controller (BSC) 106 and a mobile switching center (MSC) 102. The MSC 102 may be configured to interface with a public switch telephone network (PSTN) 104. The MSC 102 may also be configured to interface with the BSC 106. There may be more than one BSC 106 in the system 100. Each base station 110 may include at least one sector (not shown), where each sector may have an omnidirectional antenna or an antenna pointed in a particular direction radially away from the base stations 110. Alternatively, each sector may include two antennas for diversity reception. Each base station 110 may be designed to support a plurality of frequency assignments. The intersection of a sector and a frequency assignment may be referred to as a W-CDMA channel. The mobiles 108 may include cellular or portable communication system (PCS) telephones.

During operation of the cellular telephone system 100, the base stations 110 may receive sets of reverse link signals from sets of mobiles 108. The mobiles 108 may be conducting telephone calls or other communications. Each reverse link signal received by a given base station 110 may be processed within that base station 110. The resulting data may be forwarded to the BSC 106. The BSC 106 may provide call resource allocation and mobility management functionality including the orchestration of soft handoffs between base stations 110. The BSC 106 may also route the received data to the MSC 102, which provides additional routing services for interface with the PSTN 104. Similarly, the PSTN 104 may interface with the MSC 102, and the MSC 102 may interface with the BSC 106, which in turn may control the base stations 110 to transmit sets of forward link signals to sets of mobiles 108.

Figure 2:
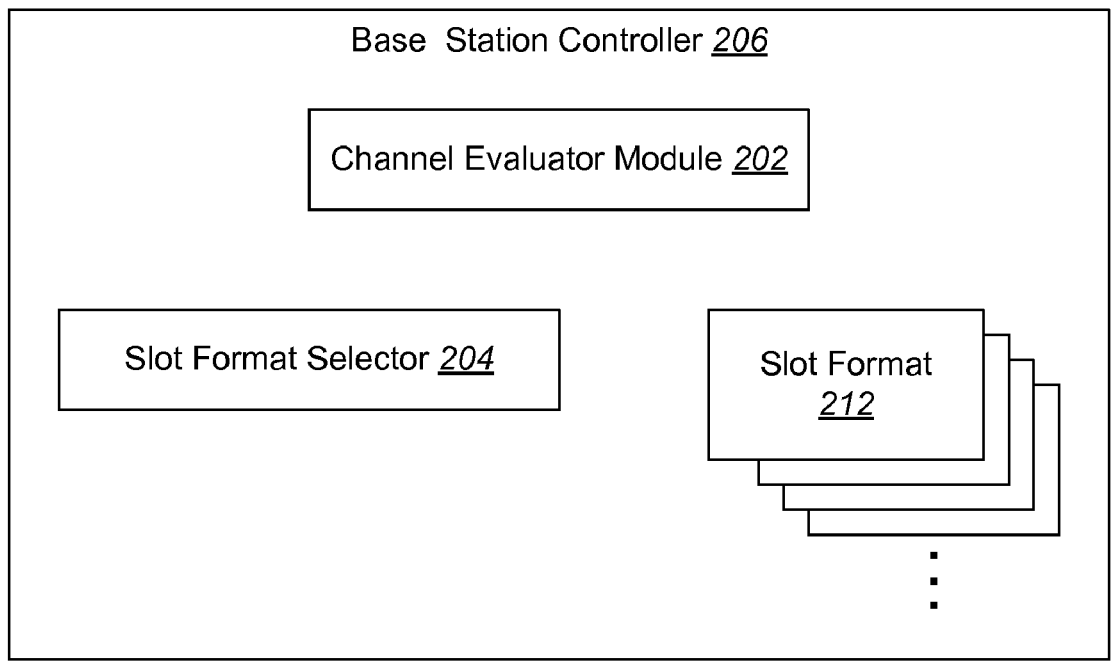
FIG. 2 is a block diagram illustrating one embodiment of a base station controller.

FIG. 2 is a block diagram illustrating one embodiment of a base station controller (BSC) 206. The BSC 206 may remove the timing restriction previous mentioned by selecting a different slot format for the F-DPCH. The F-DPCH may include one radio frame that has a duration of 10 milliseconds (ms). The F-DPCH may include 15 slots. The BSC 206 may select a different slot format for each of the 15 slots. A channel evaluator module 202 may evaluate the F-DPCH that is being transmitted from the BSC 206 to a mobile. The channel evaluator module 202 may evaluate the various slots included in the F-DPCH. The BSC 206 may also include a plurality of slot formats 212 that may be used for each of the slots of the F-DPCH. Each of the plurality of slot formats 212 may be different from one another. A slot format selector 204 may select one of the slots from the plurality 212 and this selected format may be used as the format for a slot in the F-DPCH. Selecting a different slot format allows the TPC bits transmitted on the F-DPCH of a first base station to have a timing offset that is different from the timing offset of the TPC bits transmitted on the F-DPCH of another base station. In addition, the BSC 206 may signal this timing offset to each of the base stations separately from the signaling done by a radio network controller (RNC). In other embodiments, the functions of the BSC 206 described above may be integrated into one or more base stations.

Figure 3:
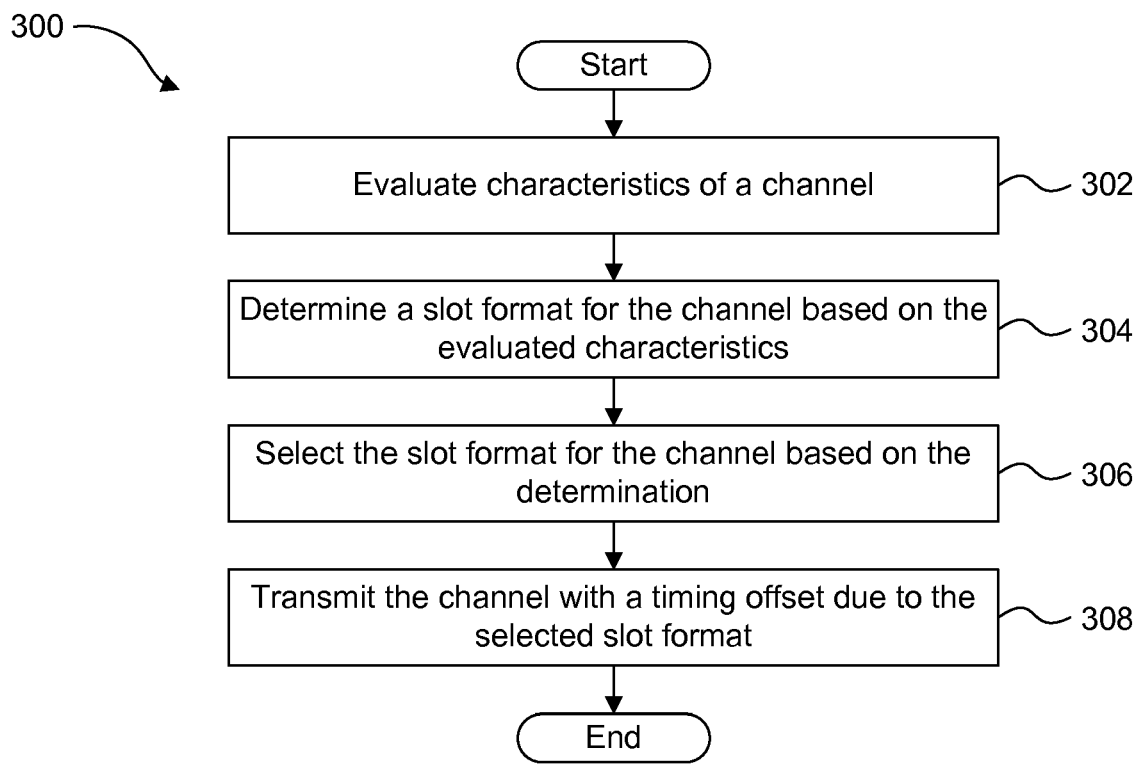
FIG. 3 is a flow diagram illustrating a method for increasing the capacity of the channel in a communications system.

FIG. 3 is a flow diagram illustrating a method 300 for increasing the capacity of the channel in a communications system. In one embodiment, characteristics of the channel may be evaluated 302. A slot format for each of the various slots in the channel is determined 304. In one embodiment, the determination of the slot formats is based on the evaluated characteristics of the channel. The slot format for each of the various slots is selected 306 for the channel based on the determination. The channel is transmitted 308 with a timing offset due to the selected slot formats that are applied to the channel.

Figure 3A:
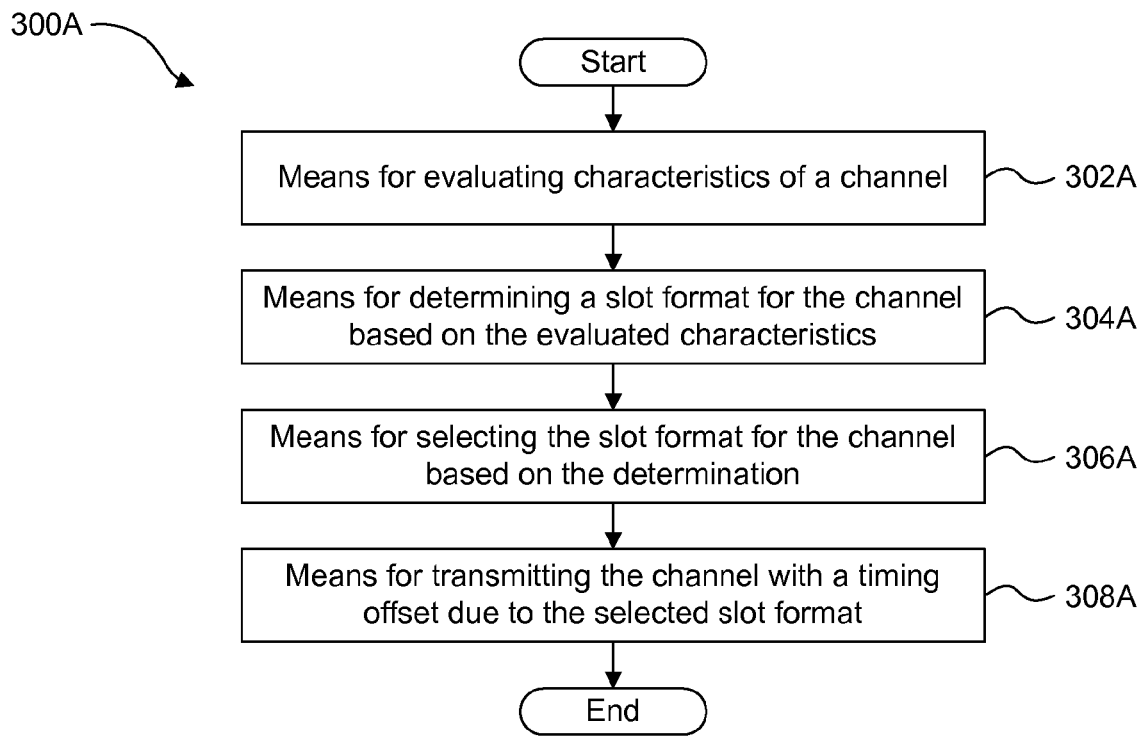
FIG. 3A illustrates means plus function blocks corresponding to the method shown in FIG. 3.

The method 300 of FIG. 3 described above may be performed by corresponding means plus function blocks 300A illustrated in FIG. 3A. In other words, blocks 302 through 308 illustrated in FIG. 3 correspond to means plus function blocks 302A through 308A illustrated in FIG. 3A.

Figure 4:
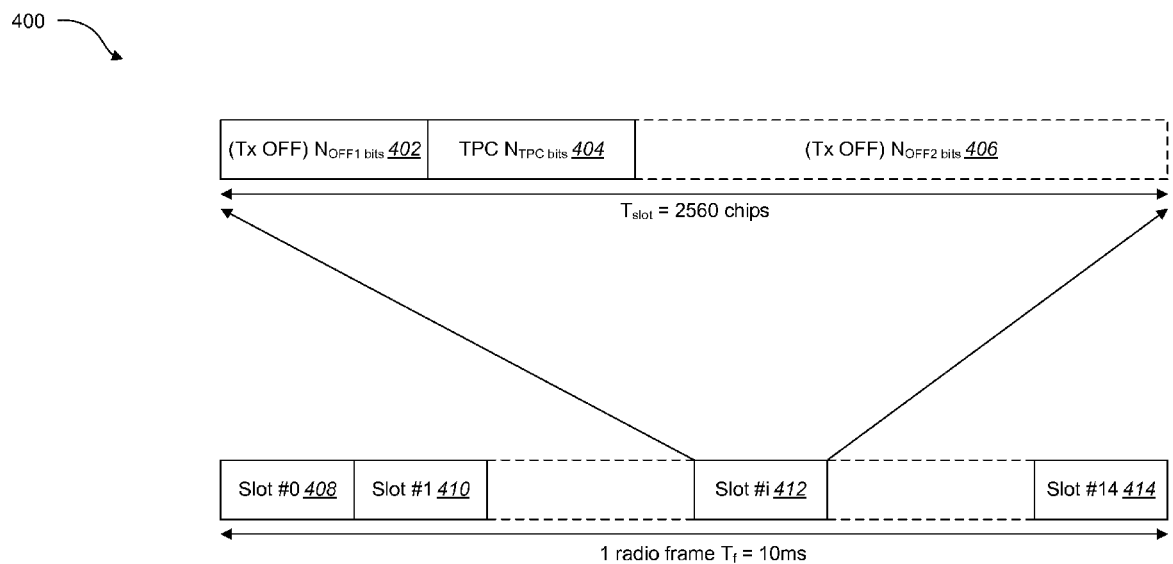
FIG. 4 illustrates one embodiment of the frame structure of a fractional dedicated physical channel.

FIG. 4 illustrates one embodiment of the frame structure of the F-DPCH 400. The frame may have a length of 10 ms and include 15 slots 408, 410, 412, 414. Each of the slots, such as slot #i 412 may have a length of 2560 chips. Each slot may correspond to one power-control period. In on embodiment, each slot, such as slot #i 412, includes a first Tx OFF 402 section in which $N_{OFF1}$ bits may be transmitted. The slot #i 412 may also include a TPC section 404 in which $N_{TPC}$ bits are transmitted to a mobile. In addition, the slot #i 412 may also include a second Tx OFF 406 section in which $N_{OFF2}$ bits may be transmitted. The number of bits sent in the first Tx OFF section 402, the TPC section 404 and the second Tx OFF section 406 may be altered, thus changing the slot format of slot #i 412. In one embodiment, a set of slot formats are defined for offset. A network may select the slot format for the F-DPCH of each base station. In one embodiment, selecting a slot format for the F-DPCH of each base station allows the network to utilize every available F-DPCH offset, without modifying the frame timing of the mobile that receives the F-DPCH.

FIG. 5 is a slot format chart 500 that illustrates the number of bits of the OFF periods 402, 406 and of the TPC field 404 previously mentioned in FIG. 4. The chart 500 includes a plurality of slot formats 502. For each slot format, a corresponding channel bit rate 504, channel symbol rate 506, SF 508, bits/slot 510, $N_{OFF1}$ bits/slot 512, $N_{TPC}$ bits/slot 514 and $N_{OFF2}$ bits/slot 516 is also illustrated. Each slot format 502 may correspond to a different set of OFF periods within the F-DPCH slot. For example, the slot format #3 may include a channel bit rate 504 of three and a channel symbol rate 506 of 1.5. In addition, the slot format #3 includes a SF 508 of 256 as well as 20 bits. For the slot format #3, 8 $N_{OFF1}$ bits may be in the first Tx OFF section 402, 2 $N_{TPC}$ bits in the TPC section 404 and 10 $N_{OFF2}$ bits in the second Tx OFF section 406. As illustrated, nine different slot formats 502 may be selected for the F-DPCH. Each of the nine different slot formats 502 include a different timing offset for the TPC bits transmitted to the mobile. The F-DPCH with the modified slot formats does not change the radio frame timeline. In one embodiment, the TPC bit processing timeline by the mobile may be changed for a given F-DPCH if the slot formats 502 are implemented. However, the TPC turn around time may not be modified.

Figure 6:
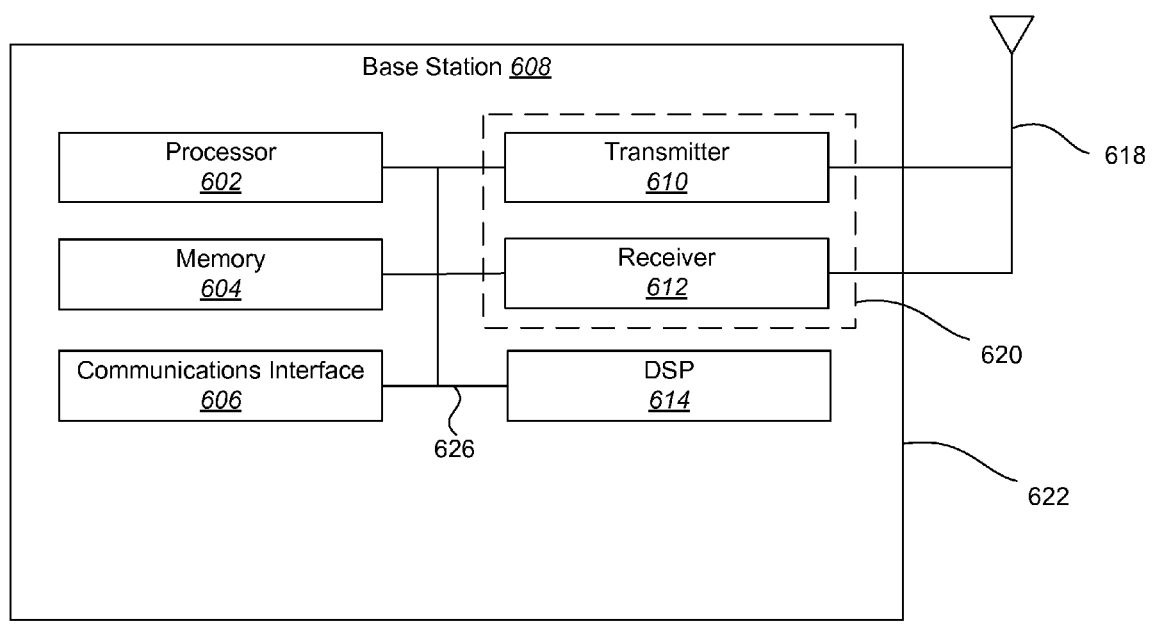
FIG. 6 illustrates various components that may be utilized in a base station.

FIG. 6 is a block diagram of a base station 608 in accordance with one embodiment of the disclosed apparatus. The base station 608 may be a base station controller, a base station transceiver, etc. The base station 608 includes a transceiver 620 that includes a transmitter 610 and a receiver 612. The transceiver 620 may be coupled to an antenna 618. The base station 608 further includes a digital signal processor (DSP) 614, a general purpose processor 602, a memory 604, and a communication interface 606. The various components of the base station 608 may be included within a housing 622.

The processor 602 may control operation of the base station 608. The processor 602 may also be referred to as a CPU.

The memory 604, which may include both read-only memory (ROM) and random access memory (RAM), provides instructions and data to the processor 602. A portion of the memory 604 may also include non-volatile random access memory (NVRAM).

Figure 7:
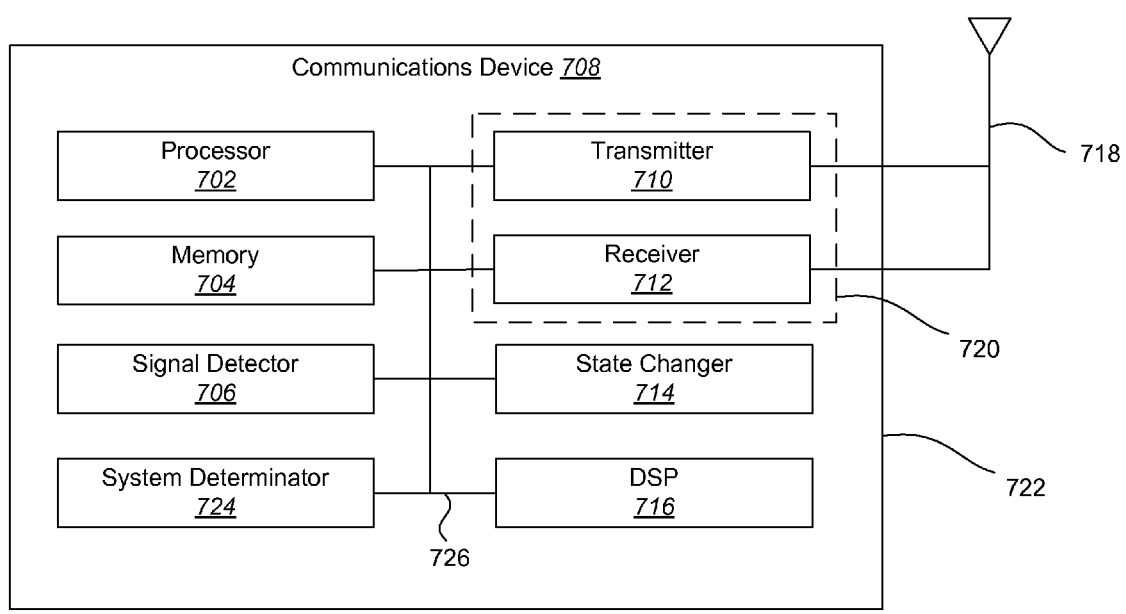
FIG. 7 illustrates various components that may be utilized in a communications device.

FIG. 7 illustrates various components that may be utilized in a communications device 708. The communications device 708 may include a mobile, user equipment, a personal digital assistant (PDA), etc. The communications device 708 may include a processor 702 which controls operation of the device 708. The processor 702 may also be referred to as a CPU. Memory 704, which may include both read-only memory (ROM) and random access memory (RAM), provides instructions and data to the processor 702. A portion of the memory 704 may also include non-volatile random access memory (NVRAM).

The communications device 708 may also include a housing 722 that may include a transmitter 710 and a receiver 712 to allow transmission and reception of data between the communications device 708 and a remote location. The transmitter 710 and receiver 712 may be combined into a transceiver 720. An antenna 718 may be attached to the housing 722 and electrically coupled to the transceiver 720.

The communications device 708 may also include a signal detector 706 that may be used to detect and quantify the level of signals received by the transceiver 720. The signal detector 706 may detect such signals as total energy, pilot energy per pseudonoise (PN) chips, power spectral density, and other signals.

A state changer 714 of the communications device 708 may control the state of the communications device 708 based on a current state and additional signals received by the transceiver 720 and detected by the signal detector 706. The device 708 may be capable of operating in any one of a number of states. The communications device 708 may also include a system determinator 724 that may be used to control the device 708 and to determine which service provider system the device 708 should transfer to when it determines the current service provider system is inadequate.

The various components of the communications device 708 may be coupled together by a bus system 726 which may include a power bus, a control signal bus, and a status signal bus in addition to a data bus. However, for the sake of clarity, the various busses are illustrated in FIG. 7 as the bus system 726. The communications device 708 may also include a digital signal processor (DSP) 716 for use in processing signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. A method for increasing the capacity of a channel in a communications system, the channel comprising a plurality of slots, the slots having a slot format among a set of slot formats, the method comprising:
evaluating characteristics of the channel;
selecting a slot format among the set of slot formats, wherein the selection is based on the evaluated characteristics of the channel, wherein selecting the slot format comprises selecting the position of a signal within each of the plurality of slots, and wherein the position of the signal is different for each of the slot formats; and
transmitting the signal in each of the plurality of slots over the channel.

2. The method of claim 1, where the signal is a power control command (TPC).

3. The method of claim 1, wherein the channel is a fractional dedicated physical channel.

4. The method of claim 1, wherein the channel is transmitted in a Wideband Code Division Multiple Access (W-CDMA) system.

5. The method of claim 1, wherein the channel comprises ten streams for transmitting bits.

6. The method of claim 1, wherein the channel is transmitted from a base station to a mobile.

7. The method of claim 6, wherein the mobile comprises an active list, wherein the active list comprises the identification of one or more base stations.

8. The method of claim 6, wherein the slot formats are specific to the base station.

9. The method of claim 1, wherein a slot format differs from another slot format through a different timing offset.

10. The method of claim 1, wherein the channel is transmitted in an asynchronous network.

11. The method of claim 1, further comprising transmitting ten transmission power control (TPC) bits on the channel.

12. The method of claim 11, wherein the signal comprises transmission power control (TPC) bits, and wherein the TPC bits comprise a base station-specific offset.

13. The method of claim 11, further comprising combining TPC bits with different timing offsets at a mobile.

14. A base station that is configured to increase the capacity of a channel in a communications system, the channel comprising a plurality of slots, the slots having a slot format among a set of slot formats, the base station comprising:
a processor;
memory in electronic communication with the processor;
instructions stored in the memory, the instructions being executable to:
evaluate characteristics of the channel;
select a slot format among the set of slot formats, wherein the selection is based on the evaluated characteristics of the channel, wherein selecting the slot format comprises selecting the position of a signal within each of the plurality of slots, and wherein the position of the signal is different for each of the slot formats; and
transmit the signal in each of the plurality of slots over the channel.

15. The base station of claim 14, wherein the channel is a fractional dedicated physical channel.

16. The base station of claim 14, wherein the channel is transmitted in a Wideband Code Division Multiple Access (W-CDMA) system.

17. The base station of claim 14, wherein the channel comprises ten streams for transmitting bits.

18. The base station of claim 14, wherein the channel is transmitted from a base station to a mobile.

19. The base station of claim 18, wherein the mobile comprises an active list, wherein the active list comprises the identification of one or more base stations.

20. The base station of claim 18, wherein the slot formats are specific to the base station.

21. A computer program product, comprising:
a non-transitory computer-readable medium, comprising:
code for evaluating characteristics of a channel in a communications system, wherein the channel comprises a plurality of slots, the slots having a slot format among a set of slot formats;
code for selecting the slot format among the set of slot formats, wherein the selection is based on the evaluated characteristics of the channel, wherein selecting the slot format comprises selecting the position of a signal within each of the plurality of slots, and wherein the position of the signal is different for each of the slot formats; and
code for transmitting the signal in each of the plurality of slots over the channel.

22. A mobile that is configured to increase the capacity of a channel in a communications system, the channel comprising a plurality of slots, the slots having a slot format among a set of slot formats, the mobile comprising:
a processor;
memory in electronic communication with the processor;
instructions stored in the memory, the instructions being executable to:
provide the timing of one or more slots to a base station;
receive a timing offset that is based on the timing of the one or more slots provided to the base station, wherein the timing offset indicates the position of a signal within the one or more slots; and
receive one or more slots on a fractional dedicated physical channel (F-DPCH), wherein the one or more slots comprise the signal with a timing offset that is different from the timing offset of the signal transmitted to different mobiles.

23. A method for increasing the capacity of a communication system, comprising:
receiving a first slot of a first channel from a first base station, the first slot using a first slot format;
receiving a second slot of a second channel from a second base station, the second slot using a second slot format that is different from the first slot format, wherein the first and second slots carry a first and a second power control command; and
adjusting the transmit power of the device according to the first and second power control commands.

24. An apparatus for increasing the capacity of a channel in a communications system, the channel comprising a plurality of slots, the slots having a slot format among a set of slot formats, the apparatus comprising:

means for evaluating characteristics of the channel;
means for selecting a slot format among the set of slot formats, wherein the selection is based on the evaluated characteristics of the channel, wherein the means for selecting the slot format comprises means for selecting the position of a signal within each of the plurality of slots, and wherein the position of the signal is different for each of the slot formats; and
means for transmitting the signal in each of the plurality of slots over the channel.

* * * * *